United States Patent [19]

de Rego

[11] Patent Number: 4,779,459

[45] Date of Patent: Oct. 25, 1988

[54] GAS METER INCLUDING A SYNTHETIC MEMBRANE

[75] Inventor: Andre de Rego, Antony, France

[73] Assignee: Flonic, S.A., Montrouge, France

[21] Appl. No.: 828,414

[22] Filed: Feb. 11, 1986

[30] Foreign Application Priority Data

Feb. 12, 1985 [FR] France ................ 85 01931

[51] Int. Cl.$^4$ ............... G01F 11/08; G01F 15/16
[52] U.S. Cl. .................. 73/269; 73/274; 73/278; 73/279; 92/103 F; 92/170
[58] Field of Search ........... 73/262, 263, 264, 269, 73/274, 279, 278; 92/99, 103 F, 103 SD, 170; 264/23

[56] References Cited

U.S. PATENT DOCUMENTS

| Re. 28,000 | 4/1974 | Branitzky | 73/273 |
|---|---|---|---|
| 212,488 | 2/1879 | Mounteney | 73/279 |
| 2,874,569 | 2/1959 | Gray | 73/279 |
| 2,976,726 | 3/1961 | Clair et al. | 73/279 |
| 3,314,291 | 4/1967 | Anderson | 73/279 |
| 3,376,179 | 4/1968 | Balamuth | 264/23 |
| 3,773,205 | 11/1973 | Keeler | 264/23 |
| 3,834,231 | 9/1974 | Hisada | 73/279 |
| 4,539,849 | 9/1985 | Pike | 73/756 |
| 4,559,832 | 12/1985 | Burlage et al. | 73/861.24 |

OTHER PUBLICATIONS

Bellogram Corp. advertisement in Machine Design 5/10/84.

Primary Examiner—Herbert Goldstein
Attorney, Agent, or Firm—Dale V. Gaudier

[57] ABSTRACT

A gas meter includes a housing made of thermoplastic material having an inside wall defining two measuring chambers and a deformable membrane disposed between the two measuring chambers. The deformable membrane is formed from a film of thermoplastic elastomer material bonded to a synthetic fiber sheet. The periphery of the membrane is hot-welded to the wall between the two measuring chambers to form a gas-tight seal between the chambers. A mechanical drive train includes at least one lever having a hinged portion made from a thermoplastic material which is hot-welded to the middle of the membrane. The train drives a mechanical distributor disposed outside the housing.

8 Claims, 5 Drawing Sheets

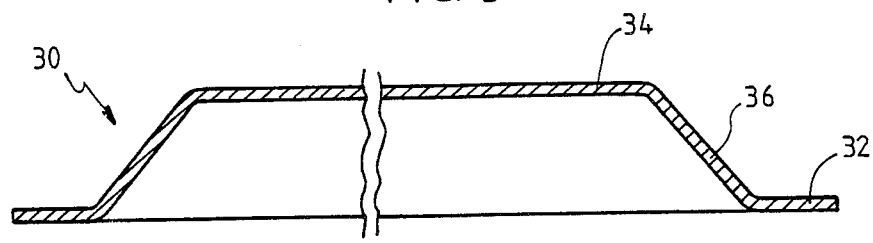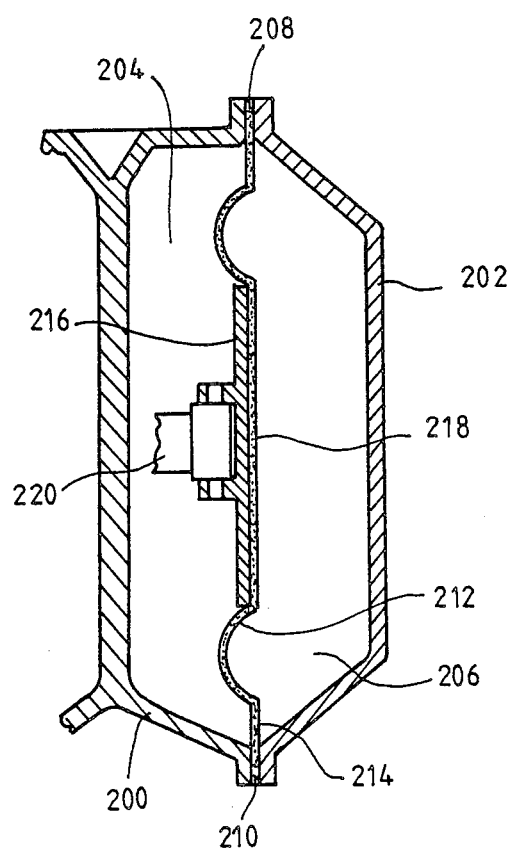

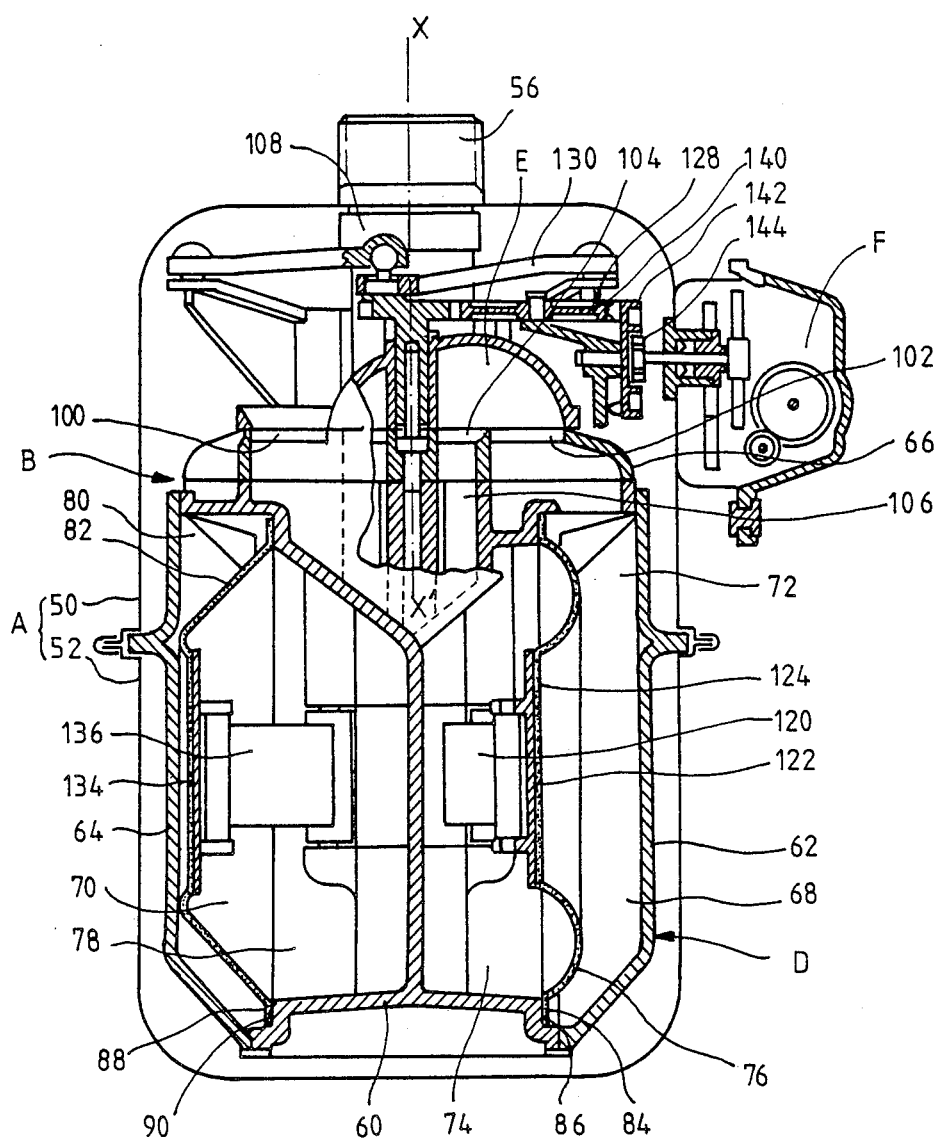

4,779,459

GAS METER INCLUDING A SYNTHETIC MEMBRANE

The present invention relates to a method of making synthetic membranes for a gas meter, and to gas meters including a membrane obtained by the said method.

BACKGROUND OF THE INVENTION

It is well known that so-called "chamber" gas meters contain at least one deformable membrane which separates two adjacent displacement measuring chambers. The gas whose flowrate is to be measured is injected into and evacuated from the measuring chambers and causes the membrane to move back and forth. Membrane motion is transmitted by a mechanical system to a counter which thus serves to display the quantity of gas which has passed through the measuring chambers. The periphery of the membrane is fixed to the common wall of the chambers and the central portion of the membrane is fixed to the mechanism which connects the membrane to the counter.

In order for the gas meter to supply the desired measuring accuracy, it is necessary for the membrane itself to have well-specified properities. It must be gastight to a very high degree. For example, the membrane must be able to withstand a pressure of 50 millibars for a period of one minute with practically no leakage. The membrane must also be very flexible and it must be able to withstand mechanical fatigue as tested by endurance tests. For example, the membrane must be capable of withstanding 2,000,000 cycles at a frequency of 100 cycles per minute without suffering significant deterioration. Further, the membrane must not suffer from exposure to the various hydrocarbons which may be present in the gas to be measured. In particular, the tests require a membrane to withstand a mixture of toluene and heptane.

Traditionally, this type of meter has made use of membranes made from specially selected and treated goatskin. They are relatively expensive. Because of the above-mentioned requirements, it has long remained difficult to make membranes out of synthetic material which have the desired characteristics. Thus proposals have already been made to make the membrane from a structure of woven fibers, e.g. polyester fibers with the structure being impregnated with layers of synthetic rubber. Such rubber-impregnated structures present storage problems by virtue of self-vulcanization phenomena which occur over time at ambient temperature. This solution suffers from the drawback that the synthetic rubber must be vulcanized in order to acquire its final properties. Such vulcanization consumes non-negligible quantities of energy. Further, as is well known, synthetic rubber processing gives rise to non-negligible pollution risks.

Proposals have also been made to provide membranes using a single layer of plastic material. None of these attempts has yet given results which are satisfactory for use in a gas meter.

In order to remedy these drawbacks, an aim of the invention is to provide a method of making membranes which are usable in gas meters and which do not require vulcanization techniques, while nevertheless enabling membranes to be obtained whose mechanical strength and flexibility are sufficient, while still remaining chemically inert relative to materials likely to be present in the gas to be measured.

SUMMARY OF THE INVENTION

In accordance with the invention, this aim is achieved by a method of making a gas meter membrane comprising the following steps:

a film of thermoplastic elastomer material is disposed opposite to one face of a synthetic fiber structure of substantially constant thickness;

said elastomer material is raised to its softening temperature;

simultaneously, pressure is exerted on the assembly constituted by said structure and said film in order to cause said elastomer material to adhere to said structure, to close the interstices in said structure, and to completely cover said face of the structure by deformation of said film;

said pressure is then removed and the resulting complex is allowed to cool; and said complex is shaped in order to obtain a membrane of the desired shape.

The resulting membrane has sufficient flexibility and mechanical strength and does not require any vulcanization.

In a preferred implementation of the method, a film of thermoplastic elastomer material is disposed on either side of the synthetic fiber structure and pressure is exerted on the assembly constituted by the structure and the two films of thermoplastic elastomer.

The resulting membrane is completely symmetrical in structure.

Also preferably, the material constituting the synthetic fibers is a polyester, and said structure is woven.

Also preferably, the thermoplastic elastomer film is a polyurethane.

Another aim of the invention is to provide a gas meter in which fixing the periphery of the membrane to the body of the meter in sealed manner is simplified. To achieve this aim, the meter housing is made of a thermoplastic material, the membrane is obtained by performing the method in accordance with the invention as defined above, and the periphery of the membrane is hot welded to the housing.

BRIEF DESCRIPTION OF THE DRAWINGS

Other characteristics and advantages of the invention appear more clearly from reading the following description of several implementations of the invention given by way of nonlimiting example. The description refers to the accompanying drawings, in which:

FIG. 3 is a section through a shaped membrane in accordance with the invention;

FIG. 5 is a section view on a line V—V of FIG. 4; and

FIG. 6 is a view in partial section of a variant embodiment of a gas meter in accordance with the invention.

DETAILED DESCRIPTION OF PREFERRED EMBODIMENTS OF THE INVENTION

Figure 1A:
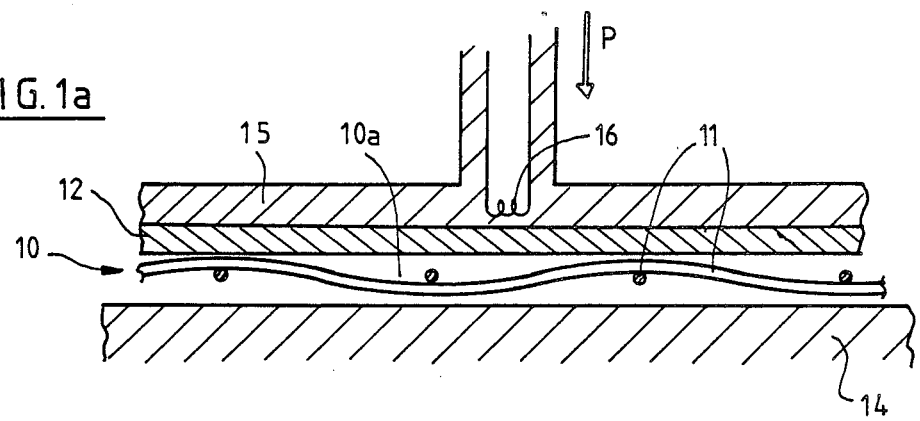
FIGS. 1a and 1b illustrate a first embodiment of a synthetic membrane in accordance with the invention shown in section on a vertical plane.
Figure 1B:
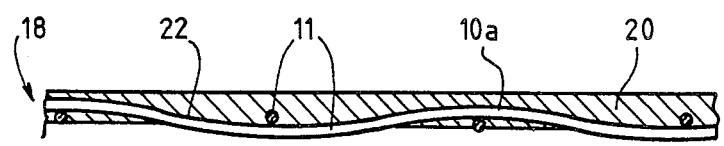

Reference is made initially to FIGS. 1a and 1b while describing a first embodiment of a synthetic membrane for gas meters in accordance with the invention. The initial structure is constituted by a structure of synthetic fibers given an overall reference 10, and by a film of thermoplastic elastomer material 12. Preferably, the structure 10 of synthetic fibers 11 is of the woven type, however it could be non-woven, or it could be knitted. In the particular example described, the fibers 11 are made of polyester, and the weight of these fibers expressed in grams per 10,000 meters of fiber is about 50. More precisely, the fibers used are 33 decitex fibers (33 g/10,000 m of fiber). The mesh of the woven cloth may be square having a side which is about 2/10 millimeters long. The thickness of the cloth is substantially constant and about 10/10-ths of a millimeter. Polyamide fibers could also be used. The thermoplastic film 12 is preferably the material sold under the trademark PLATILON U by the German PLATE BONN corporation. This material is a polyurethane. Preferably, the film is about 2.5 to 3/100-ths of a millimeter thick. Alternatively, the film could also be a thermoplastic polyester elastomer based on a polyether ester, for example the material sold under the trademark ARNITEL by the Dutch AKZO PLASTICS corporation.

In order to make the membrane from the structure 10 and the film 12, the structure 10 is placed on a plate 14 and the film 12 is placed on one the faces 10a of the structure 10. A second plate 14 containing heater means symbolized by a heater resistance 16 is pressed against the stack constituted by the structure 10 and the film 12 to obtain a predetermined pressure while raising the polyurethane film 12 to its softening temperature. In the particular example described, the softening temperature is about 170° C., and the pressure is about 50 bars. The pressure is maintained using the plate 14 for a period of about 1 minute, and then the pressure is removed and the resulting complex 18 is allowed to cool. Since the thermoplastic material has been raised to its softening temperature, its final structure as shown in FIG. 1b clearly indicates that the plastic material having an overall reference 20 is deformed and penetrates into the interstices such as 22 defined by the fibers 11 of the structure 10. However, it should be observed that the plastic material 20 completely covers the face 10a of the structure 10 against which the thermoplastic film was disposed. The resulting complex 18 is completely gas-tight and has the required mechanical strength to withstand the set number of cycles while retaining sufficient flexibility due, in particular, to the thickness of the plastic material 20. The membrane per se is obtained from said complex by shaping the complex. This consists essentially in giving the complex a curved shape and in cutting out the periphery of the membrane to give it the required size. These operations may be performed using a mold which presents the desired final shape of the membrane. The mold is heated to a temperature which is below the softening temperature of the complex, e.g. 120° C. to 130° C. for a period of 10 minutes. The mold is then allowed to cool together with the membrane before unmolding the shaped membrane.

FIG. 3 shows a shaped membrane in accordance with the invention. The membrane 30 includes a substantially plane flange 32, a bottom 34 which is also substantially plane, and a bellows-forming portion 36. In order to simplify FIG. 3, it does not show the structure of the membrane which is the same as that shown in FIGS. 1b and 2b.

Other tests have shown that a structure having a substantially square mesh with a side of up to 3 to 4 millimeters may also be used.

In the above-described example, the membrane is obtained discontinuously by means of a fixed plate 14 and a moving plate 15. Naturally, the membrane could be obtained continuously by using glazing rollers.

Figure 3A:
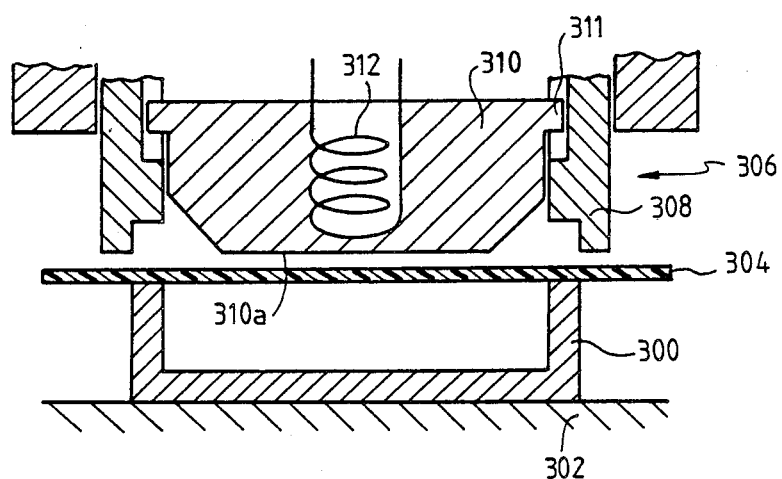
FIG. 3a is a vertical section through a machine for shaping a membrane.

FIG. 3a is a section through a machine for shaping a pre-existing complex to obtain a membrane for a gas meter. The machine comprises a support 300 in the form of a frame whose size corresponds to the desired size of the plane flange round the membrane to be shaped. The support 300 stands on a fixed plate 302 of a press. The complex 304 to be shaped rests on the top of the frame 300. The machine also includes a moving assembly 306 including a thrust member 308 and a male mold portion 310. The thrust member 308 is mounted on the moving plate of the press. The member 308 is also in the form of a frame so that when lowered it clamps the periphery of the complex between itself and the rim 300a of the support 300.

The active end 310a of the mold portion 310 has a shape corresponding to that which is to be given to the membrane. The mold portion 310 includes heater means represented by a heater resistance 312.

The operation of the machine follows from the above description. Initially, the thrust member 306 is lowered to clamp the periphery of the complex 304. The male mold portion is then lowered to shape the membrane against its active face 310a by the combined actions of heating and pressure. Its downward travel is limited stop lugs 311 projecting laterally therefrom. Subsequently the heater is turned off and the membrane is unmolded after a suitable cooling period has elapsed.

Figure 3B:
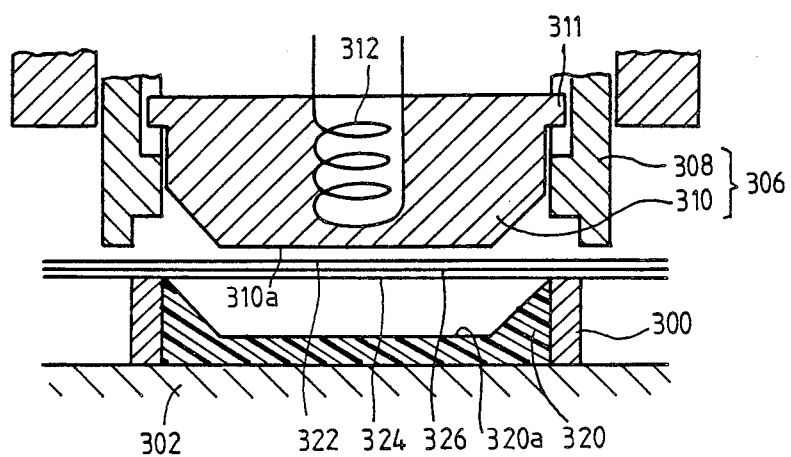
FIG. 3b is a vertical section through a machine for simultaneously making a complex and shaping it.

FIG. 3b shows a variant of the FIG. 3a machine, in which the same machine simultaneously makes the complex and shapes it. This machine is very similar to that shown in FIG. 3a and the same reference numerals have been used for parts which are common to both machines.

The difference lies in the fact that the support frame 300 is partially filled with elastomer material 320. The elastomer material may be polyurethane or silicone. It is cast into the support 300 and its top face 320a is given a hollow shape complementary to the active end of the male mold portion 310. The fill 320 thus constitutes a female mold portion which is deformable to some extent.

The three sheets from which a membrane is to be built up, namely the fiber structure 326 sandwiched between the thermoplastic films 322 and 324, are placed on the support 300.

The thrust member 308 is lowered first, followed by the male mold portion 310. The male mold portion 310 is heated by means of the heater resistance 312 to raise the thermoplastic sheets 322 and 326 to their softening temperature. Simultaneously, by virtue of the female mold portion 320, the threesheet sandwich is pressed together, firstly to constitute the said complex and then to shape the membrane. Unmolding takes place as already described with reference to FIG. 3a.

It is important to observe that the adherence of the elastomer material on the basic woven structure is obtained by hot melting which thus avoids the need to use an adhesive. Further, since the elastomer used is of the thermoplastic type, there is no need for any vulcanization operation in order to reach its final state.

Figure 2A:
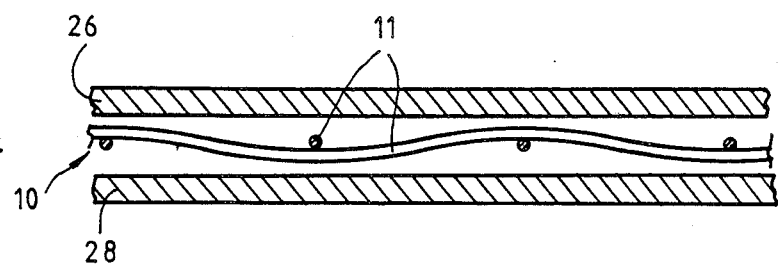
FIG. 2a and 2b show a variant embodiment of the membrane in vertical section views.
Figure 2B:
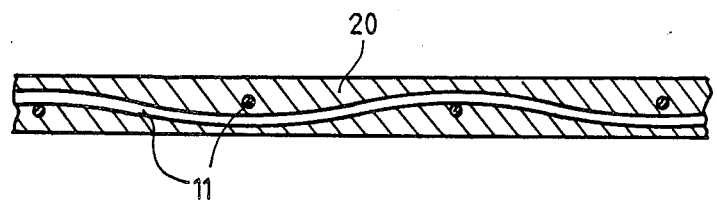

As can be seen in FIGS. 2a and 2b, it is preferable to make membrane which is symmetrical in structure by using a woven structure 10 identical to the structure 10 in FIG. 1a together with two thermoplastic elastomer films which are respectively referenced 26 and 28 and which are initially disposed on either side of the structure 10. Both thermoplastic films 26 and 28 are raised to their softening temperature by the same operation as described above with reference to FIGS. 1a and 1b in order to deform the films against the base structure 10 and obtain a complex such as that shown in FIG. 2b. In this case, both faces of the base structure are covered in hot meltable material 20. The membrane thus obtained from a polyester cloth and films of thermoplastic material having the above-described characteristics, is about 15/100-ths of a millimeter thick.

As is well known, in order to obtain a membrane which can actually be used in a gas meter, the complex must be cut out and it must be given the required shape instead of its initial plane shape. These membrane-shaping operations may be performed conventionally as described above.

Instead of using a woven structure as described above, a knitted structure may be used. Such structures are well known per se. A knitted structure is particularly suitable for use with a single thermoplastic film.

In addition to the advantages already mentioned, a membrane obtained by the method in accordance with the invention is easier than prior art membranes to fix on the walls of the meter's measuring chamber provided that said walls are made of a plastic material. Using a conventional membrane, the periphery of the membrane is generally fixed to the wall of the measuring chamber by means of a retaining washer which is fixed to the wall, with the periphery of the membrane being clamped between the washer and a shoulder in the wall, as described in European patent application No. 128 838 for a gas meter and filed in the name of the present Applicant. A membrane in accordance with the invention may be directly fixed to the wall in a gastight manner by hot welding.

Figure 4:
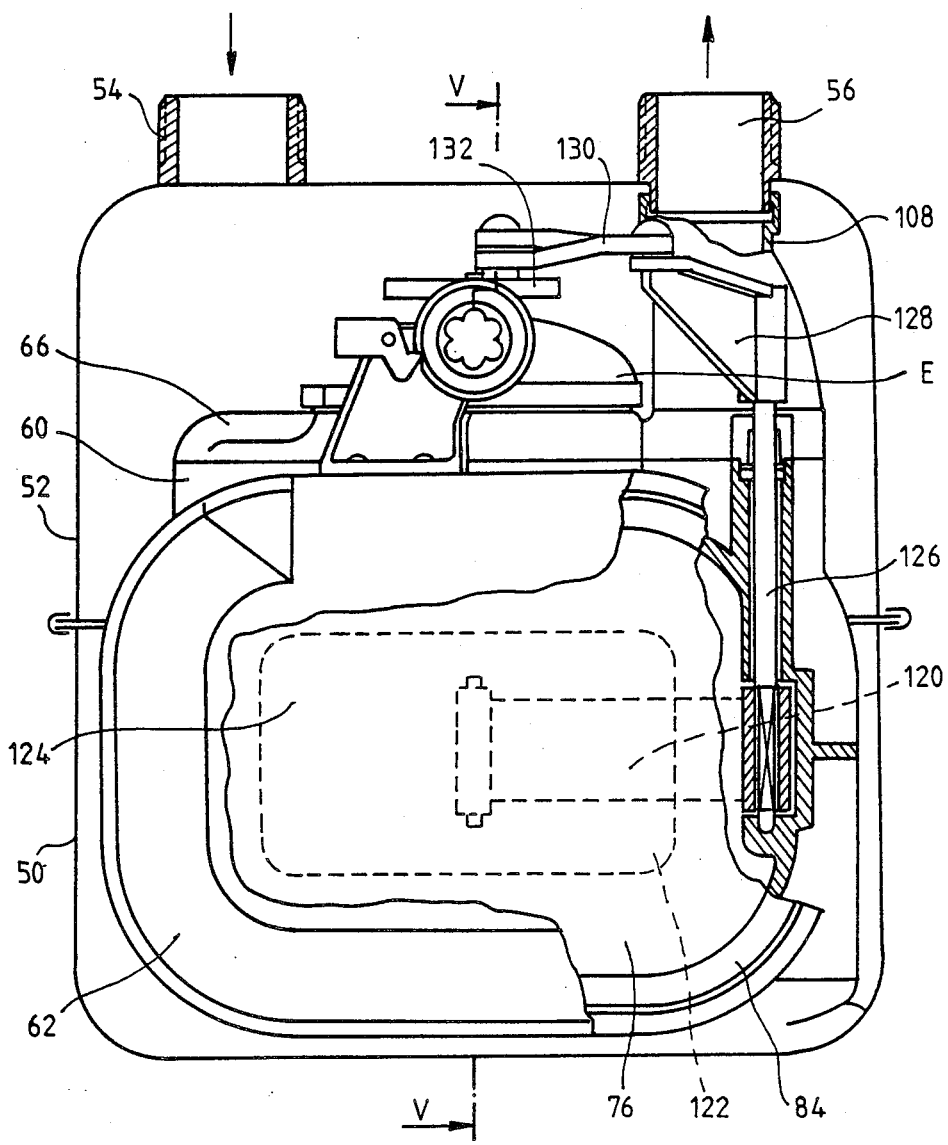
FIG. 4 is a partially cutaway elevation view of a gas meter in accordance with a first implementation of the invention.

Reference is now made to FIGS. 4 and 5 for describing an embodiment of a gas meter in accordance with the invention, said embodiment including two membranes obtained by the method of the invention.

The meter has exactly the same structure as the meter described in the above-mentioned European patent application, except that the following items are different: the membranes forming the bellows; the method of fixing the bellows to the meter housing; and the ends of the levers of the meter drive chain where connected to the bellows. The overall structure of the meter is thus recalled only briefly.

The meter comprises a gastight outer envelope A made up of two shells 50 and 52 and provided with a gas inlet nozzle 54 for the gas to be measured and a gas outlet nozzle 56. Inside the envelope A, the meter includes a measuring unit B comprising a housing D and a rotary distributer E. Finally, the meter includes a counter F.

The housing D comprises a central block 60, two side covers 62 and 64, and a distribution cover 66. The central block 60 and the side covers 60 and 62 are made of a thermoplastic material. For example they may be made of the thermoplastic material sold under the trademark Nylon or the material sold under the trademark Delrin. The side covers 62 and 64 are welded to the central block 60 in order to define two measuring compartments 68 and 70. The measuring compartment 68 is divided into two measuring chambers 72 and 74 by a deformable bellows 76. Similarly, the measuring compartment 70 is divided into two measuring chambers 78 and 80 by a deformable bellows 82. In accordance with the invention, the bellows 76 and 82 are constituted by shaped membranes and as defined above with reference to FIGS. 1 to 3. The rim 84 of the membrane constituting the bellows 76 is hot welded to a shoulder 86 provided on the portion of the central block 60 which faces towards the side cover 62. Similarly the rim 88 of the membrane constituting the bellows 82 is hot welded to a shoulder 90 provided in the portion of the central block 60 facing the side cover 64. The hot welding is preferably performed using a hot tool which has the same general shape as the periphery of the membrane and which is applied thereagainst. In order to avoid the membrane from adhering to the end of the tool while being heated thereby, said end is protected by a synthetic coating whose softening temperature is considerably higher than that of the membrane. For example the material sold under the trademark "Teflon" may be used. The hot welding could also be performed by utrasonic welding.

It will be understood that this form of gastight fixing to the periphery of the membrane is made possible by the presence of the elastomer film which constitutes the outside face of the membrane and which is made of a thermoplastic, as is the meter housing. This method of fixing the bellows to the meter housing is much simpler than that described in the abovementioned European patent application, and nevertheless provides very good sealing.

Returning to the description of the housing D, it can be seen that the distribution cover 66 defines four openings, with only the openings 100 and 102 being visible in FIG. 5, together with a central gas outlet orifice 104. Each opening is connected to a respective one of the chambers 68, 72, 78, and 80 via passages formed through the central block 60. The central orifice 104 is connected to the outlet nozzle via an internal passage 106 and a duct 108.

The rotary distributor E is pivotally mounted about an axis XX' and slides over the top face of the distribution cover 66. The distributor E is described in detail in the abovementioned European patent application and serves to put each opening into communication with the outlet orifice 104 and with the inside of the envelope A into which the gas to be measured flows. Thus, each chamber 71, 74, 78, and 80 is successively connected to the gas inlet 54 and to the gas outlet 56. In order to ensure that the displacements of the bellows 76 and 82 and the rotation of the distributor E occur in synchronism, the measuring unit includes two drive-transmitting assemblies, with each assembly connecting one of the bellows 76 and 82 to the distributor E. Thus, the bellows 76 is connected inside the chamber 68 to a lever 120 having one end hinged to a bellows plate 122. In accordance with the present invention, the bellows plate 122 is made of thermoplastic material. The plate 122 is hot welded by means of a heater of the same kind as that already described for welding the periphery of the membrane to the meter housing, and the connection between the bellows plate and the membrane is much simpler than that described in the above-mentioned European patent application.

Returning to the first mechanical drive chain, it can be seen that it also includes a shaft 126 whose bottom end is fixed to rotate with the second end of the lever 120. The top end of the shaft 126 is fixed to another lever 128 and the other end of the lever 128 is hinged to a third lever 130. One end of the lever 130 is pivotally mounted on a part 132 which constitutes a handle and which is fixed to rotate with the distributor E. The other mechanical drive chain is identical to the first and it comprises, in particular, a bellows plate 134 of thermoplastic material hot welded to the synthetic membrane constituting the bellows 82. The end of a lever 136 is pivotally mounted to the bellows plate 134.

The counter F for displaying the measured quantity of gas is connected to the handle-forming part 132 by a set of toothed wheels 140, 142, and by a magnetic transmission 144. These transmission means are described in greater detail in European patent application No. 128 838.

The operation of the meter described above with reference to FIGS. 4 and 5 is identical to the operation of the meter described in the above-mentioned European patent application.

The person skilled in the art will understand that the present invention is in no way restricted to the particular type meter described above. The invention is applicable to any gas meter having chambers in which two measuring chambers are separated by a flexible membrane, with the meter housing being made of a thermoplastic material in order to enable direct hot welding between the periphery of the membrane and the inside wall of the chambers. In particular, the invention is applicable to meters have some number of measuring chambers other than four. It is also applicable to the case where the distributor uses rectilinear motion rather than rotary motion as described above.

It should be added that in the case of the meter described above with reference to FIGS. 4 and 5, the welding surfaces between the side covers 62 and 64 and the central block 60 are not plane, which is why it was necessary to provide shoulders to which the peripheries of the bellows could be welded.

FIG. 6 is a diagram illustrating a portion of a variant embodiment of the meter.

In this figure, a portion of a central block 200 is shown in simplified manner together with a side cover 202 for defining measuring chambers 204 and 206. The side cover 204 has a welding face 208 against the central block 200, which face is plane. Similarly, the portion of the central block 200 shown in FIG. 6 has a welding face 210 which is also plane. FIG. 6 shows that the chambers 204 and 206 are separated by a deformable bellows 212 constituted by the above-described synthetic membrane. The bellows 212 includes a plane rim 214 which is hot welded between the welding faces 208 and 210 of the central block 200 and the side cover 202.

Similarly, a bellows plate 216 of thermoplastic material is hot welded to the plane central portion 218 of the bellows. One end of a lever 220 belonging to the mechanical drive chain is fixed to said bellows plate.

It will be understood that the use of synthetic membranes for making gas meters not only simplifies the assembly of the bellows in the meter housing, but also eliminates certain membrane punching operations, in particular the operations required for making holes to which the bellows plates are fixed or to which the bellows-retaining washers are fixed.

I claim:

1. A gas meter comprising:
   a housing made of thermoplastic material having an inside wall and defining two measuring chambers;
   a deformable membrane disposed in said housing between said chambers;
   said membrane being made of a complex comprising a film of thermoplastic elastomer material disposed opposite to one face of a synthetic fiber structure of substantially constant thickness, said elastomer material adhering to said film structure and covering said face of the film structure;
   said membrane further including a periphery which is fixed to said inside wall by hot-welding to form a gas-tight seal between the periphery of said membrane and said inside wall;
   a moving distributor disposed outside said housing; and
   a mechanical drive train for connecting said membrane to said distributor, said drive train including at least one lever and a part for connecting one end of said lever to said membrane in a hinged manner, said part being made of a thermoplastic material which is hot-welded to the middle of said membrane.

2. The gas meter of claim 1 wherein the membrane comprises a second film of thermoplastic elastomer material disposed on a face of said fiber structure opposite said one face.

3. The gas meter of claim 1 wherein the thermoplastic elastomer material is a polyurethane.

4. The gas meter of claim 1 wherein said fibers of said structure are made of polyester.

5. The gas meter of claim 4 wherein said fibers are made of polyamide.

6. A gas meter of claim 1, wherein said fiber structure is woven and has a mesh which is substantially square with a side lying in the range of 0.2 millimeter to 4 millimeters.

7. The gas meter of claim 1, wherein said films of thermoplastic elastomer material are 25 to 30 μm thick.

8. A gas meter according to claim 1, wherein said fiber structure is knitted.

* * * * *